United States Patent [19]
Swithers et al.

[11] Patent Number: 5,750,980
[45] Date of Patent: May 12, 1998

[54] HIGH-SPEED, HIGH-RESOLUTION OPTICAL SCANNER SYSTEM

[75] Inventors: David Jonathan Swithers, North Attleboro, Mass.; Alex A. Rysin, Pawtucket, R.I.

[73] Assignee: Computer Identics, Inc., Canton, Mass.

[21] Appl. No.: 475,868

[22] Filed: Jun. 7, 1995

[51] Int. Cl.⁶ ................................................ H01J 40/14
[52] U.S. Cl. ............................ 250/214 AG; 250/214 RC
[58] Field of Search ................ 250/214 AG, 214 RC; 327/514

[56] References Cited

U.S. PATENT DOCUMENTS 4,019,048  4/1977  Maione et al. .................. 250/214 AG
4,626,676  12/1986  Gerardin ........................... 250/214 RC

*Primary Examiner*—Edward P. Westin
*Assistant Examiner*—Kevin Pyo
*Attorney, Agent, or Firm*—Iandiorio & Teska

[57] ABSTRACT

A high-speed, high-resolution optical scanner system includes a flying spot scanner for scanning a beam across an object bearing information to be read and a high-bandwidth, high-sensitivity optical receiver including an avalanche photodiode for sensing the variation in light intensity of the beam reflected from the object being scanned; a power source for biasing the avalanche diode proximate its reverse breakdown voltage to produce high current gain in response to incident light; and a charge collector circuit responsive to the avalanche photodiode for producing a voltage proportional to the light incident on the avalanche photodiode.

2 Claims, 11 Drawing Sheets

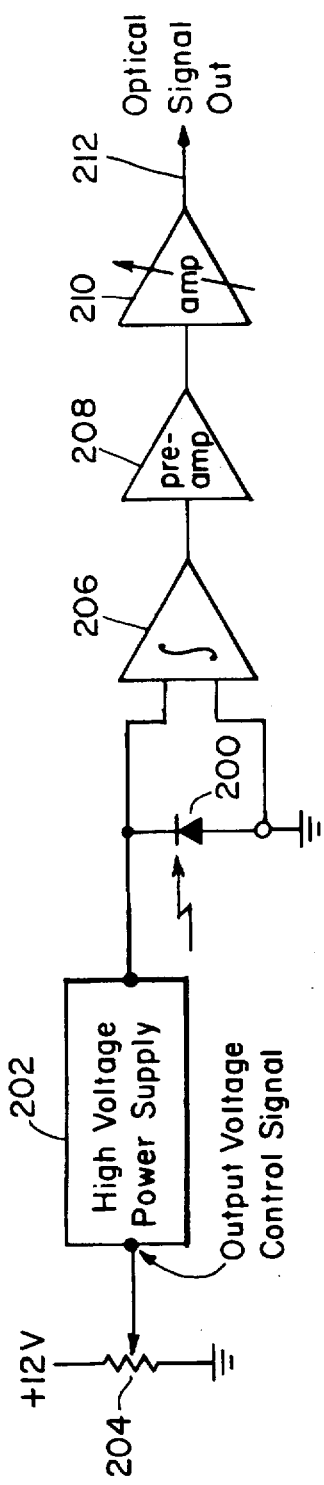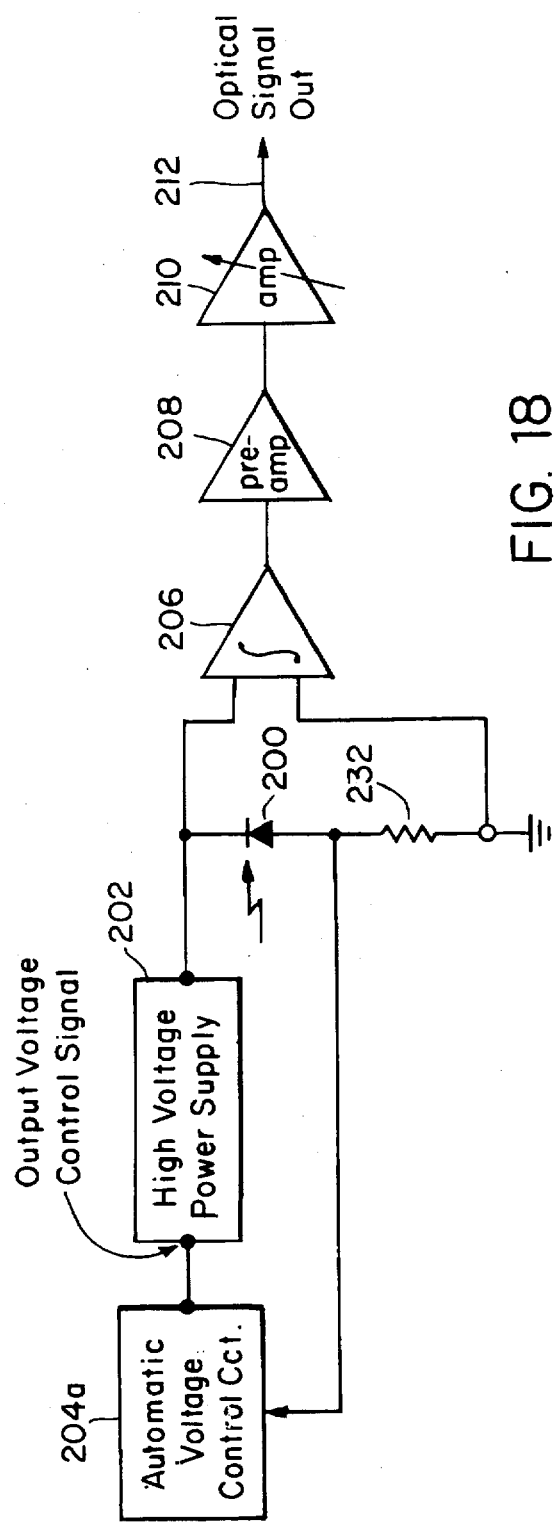
FIG. 14
FIG. 18

HIGH-SPEED, HIGH-RESOLUTION OPTICAL SCANNER SYSTEM

FIELD OF INVENTION

This invention relates to a high-speed, high-resolution optical scanner system, and more particularly to a high-bandwidth, high-sensitivity optical receiver for such a system.

BACKGROUND OF INVENTION

Optical receivers are used in many applications. These include bar code scanners, photoeyes, fiber optics, and document scanners, to name a few. Existing devices produce high sensitivity or high frequency capability, but not both. Fiber optics operate at high frequencies (up to 100 MHz) within a controlled environment (the glass fiber) and limit the length of the fiber to guarantee a minimum signal amplitude at the optical receiver. Bar code scanners operate at significant distances on reflections from a laser beam swept over a moderately reflective surface and therefore require high sensitivity.

Due to limitations of the mechanical devices which move the beam of a bar code scanner, the use of diffraction limited optics and the cost sensitivity of the bar code scanner, the bandwidth of the optical receiver is limited to a few mega-Hertz.

A typical optical receiver of existing design uses a PIN diode as the light sensing (or collecting) device. When properly biased, the current through the PIN diode changes in relation to the amount of light falling on its exposed active area. The change in current through the diode is directly proportional to the number of photons collected by the diode. At low light levels the change in current is very small and the thermal noise generated in the semiconductor material (or dark current) of the diode becomes large enough to mask the current due to light collection. To increase the sensitivity of PIN diodes the collecting area can be made larger, but this also proportionately increases the dark current. The diode can be cooled to reduce the thermally generated noise, but this adds significant cost and complexity to the system. Sensitivity can be increased by collecting photons over a longer period of time; however, this reduces the bandwidth of the receiver.

Existing receiver designs place a resistor in series with the PIN diode to convert the change in current through the diode to a change in voltage across the resistor. Since the voltage drop across a series resistor is directly proportional to its resistance ($E=I\times R$, Ohms Law) a larger resistor produces a larger voltage; therefore an increase in voltage amplification is produced by increasing the resistance. The diode however, has an intrinsic stray capacitance and the frequency response is inversely proportional to the capacitance and resistance ($F=1/(2\times PI\times R\times C)$). Therefore, the frequency response or bandwidth of the receiver is reduced as the resistance is increased.

Another existing optical receiver design uses a photomultiplier tube (PMT). Although a PMT can produce very high sensitivity with high bandwidth, a PMT is many times more expensive and much more complex than a semiconductor sensor based optical receiver. The PMT is a vacuum tube device and requires a high-voltage power supply and must be actively cooled to realize its sensitivity potential. As a vacuum tube device it is susceptible to outside electromagnetic fields and even with elaborate shielding is not usable in close proximity to a high-speed motor as is required in many applications. For example, in bar code scanners a high-speed motor is typically used with a rotating wheel to produce the line scanning effect of the laser beam. It is desirable to place all the components of the device in as small an enclosure as possible, placing the PMT and optical receiver in close proximity to the scanning motor.

SUMMARY OF INVENTION

It is therefore an object of this invention to provide a high-speed, high-resolution optical scanner system.

It is a further object of this invention to provide a high-bandwidth, high-sensitivity optical receiver for use in such a scanner system.

It is a further object of this invention to provide such a receiver which has high speed, low noise, and high gain with wide dynamic range.

It is a further object of this invention to provide such a receiver which is low cost, low power, low heat, and not susceptible to electromagnetic fields.

The invention results from the realization that a truly high-bandwidth, high-resolution optical receiver contributing to a high-speed, high-resolution optical scanner system can be achieved by biasing an avalanche photodiode near its reverse breakdown voltage to effect an extremely high gain of current generation in response to incident light energy.

This invention features a high-speed, high-resolution optical scanner system. There is a flying spot scanner for scanning a beam across an object bearing information to be read. There is also a high-bandwidth, high-sensitivity optical receiver including an avalanche photodiode for sensing the variation in light intensity in the beam reflected from the object being scanned. A power source biases the avalanche diode proximate its reverse breakdown voltage to produce high current gain in response to the incident light. A charge collector circuit responsive to the avalanche photodiode produces a voltage proportional to the light incident on the avalanche photodiode.

In a preferred embodiment the charge collector circuit may include a timer circuit for defining the increment of time during which the electrons generated by light incident on the diode are accumulated. The power source may include a voltage control circuit for sensing the current through the avalanche photodiode and adjusting the power supplied to the photodiode to maintain the photodiode proximate its reverse breakdown voltage.

DISCLOSURE OF PREFERRED EMBODIMENT

Other objects, features and advantages will occur to those skilled in the art from the following description of a preferred embodiment and the accompanying drawings, in which:

FIG. 14 is a schematic block diagram of an optical receiver according to this invention;

FIG. 18 is a schematic block diagram of an alternative embodiment of the optical receiver according to this invention with an automatic voltage control circuit for stabilizing operation of the avalanche photodiode.

Figure 1:
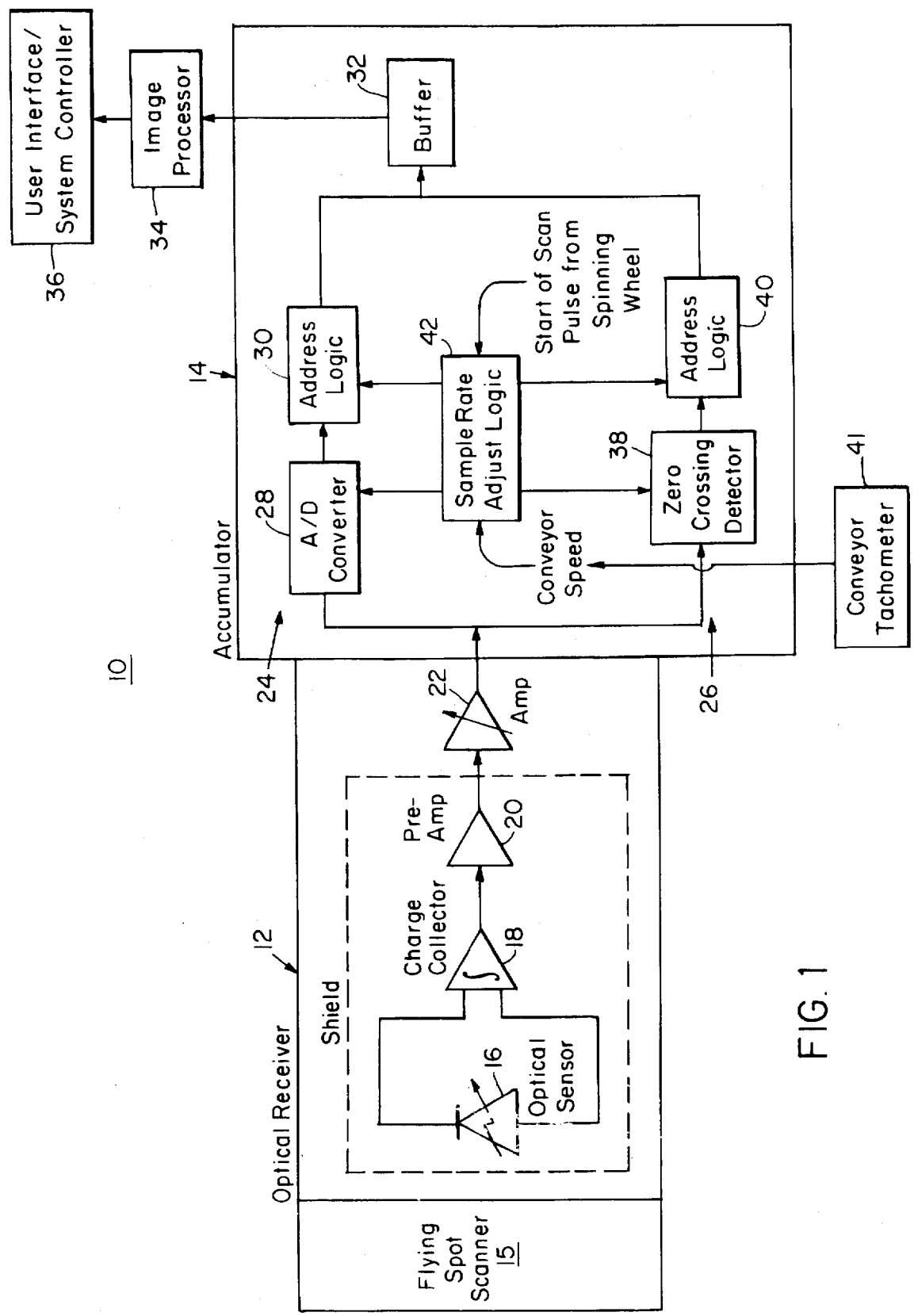
FIG. 1 is a schematic block diagram of a one-dimensional scanner system for two-dimensional image acquisition according to this invention.

There is shown in FIG. 1 a scanner system which includes an optical receiver 12 and a frame accumulator 14. The input to optical receiver 12 comes from flying spot scanner 15 which scans objects as they move by on the conveyor. Optical receiver 12 includes an optical sensor 16 which senses the return signal from a scanned object moving along a conveyor and delivers a signal representative of the data scanned to charge collector amplifier 18. The output of amplifier 18 is delivered through pre-amp 20 to an adjustable amplifier 22 and provides the ultimate input to frame accumulator 14. Frame accumulator 14 has a data acquisition channel 24 and a data compression channel 26.

Data acquisition channel 24 includes an A/D converter 28 which receives the analog signal from amplifier 22 and provides a digital output to address logic 30 which identifies a specific address for each pixel to be stored in buffer 32. The output of buffer 32 is delivered to image processor 34 which may be a microprocessor programmed with, for example, a recognition algorithm based on linear search, cross correlation, morphological analysis, or frequency domain analysis, but with any conventional software for label data acquisition and interpretation such as the Automatic Identification Manufacturers (AIM), Uniform Symbology Specification (USS) Reference Decode Algorithm for PDF417 or Code 1. Image processor 34 then provides an output to any suitable interface system or controller 36. Data compression channel 26 includes zero crossing detector 38 which detects each zero crossing from a pixel of one intensity to a pixel of a distinguishable intensity, for example, between black and white or between 8, 16 or 256 shades of gray. The zero crossing detector records the start, length and intensity of contiguously scanned pixels of like intensity. The output of each such zero crossing is delivered to address logic 40 which then causes the address of the start, the length, and the level of intensity to be stored for that particular series of like intensity pixels, thereby avoiding the need to store each of the pixels. In order to obtain square pixels a compensating device such as a sample rate adjust logic circuit 42 is used to synchronize the operation of A/D converter 28, zero crossing detector 38, and address logic 30 and 40. Sample rate adjust logic 42 receives the conveyor speed input from a conveyor tachometer or a similar timing device 42. It also receives a starter scan pulse from the spinning wheel of flying spot scanner 15, explained in more detail in FIGS. 2 and 3.

Figure 2:
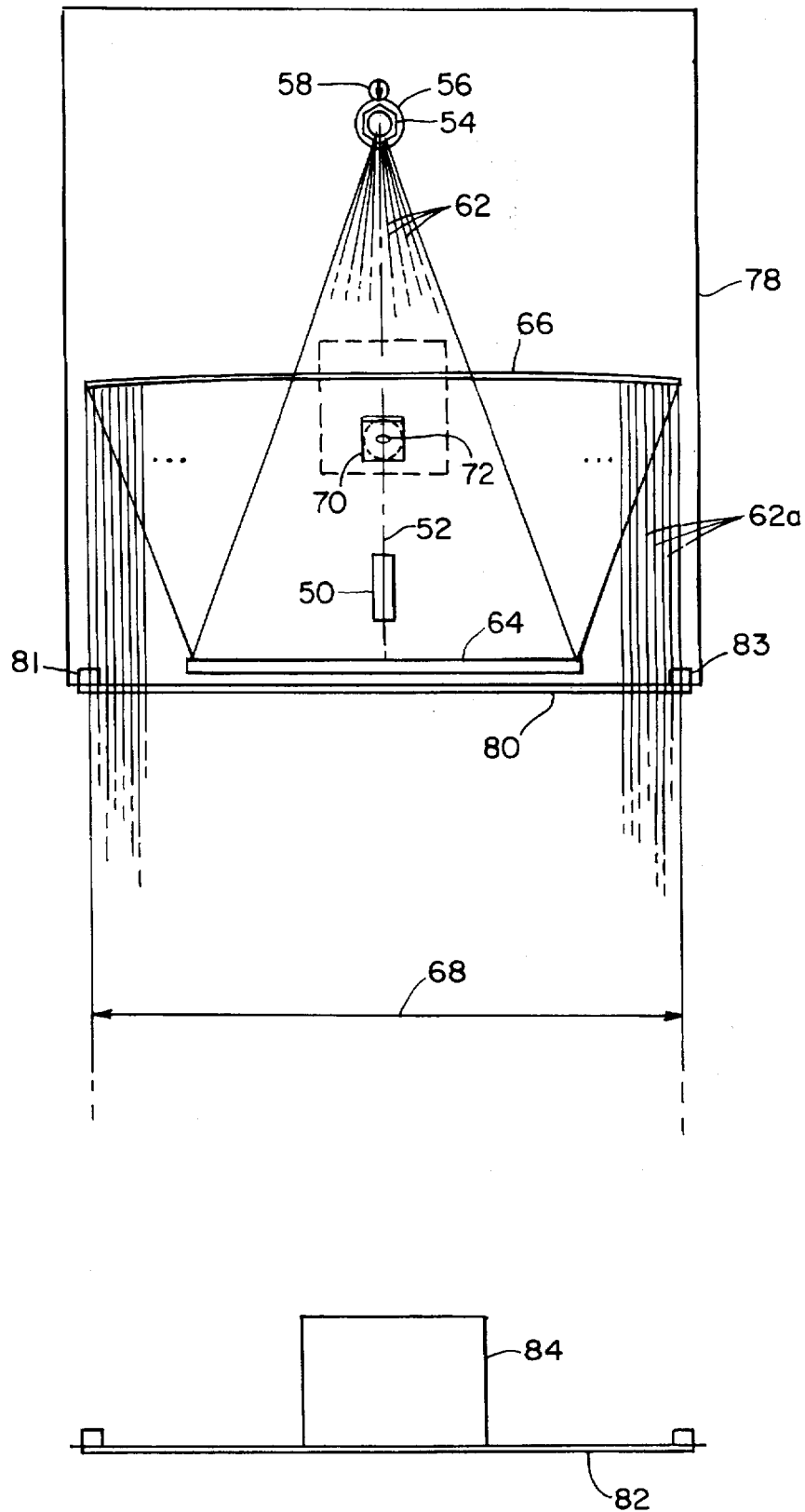
FIG. 2 is a front elevational schematic view of the optical portion of a one-dimensional scanner system for two-dimensional image acquisition according to this invention arranged to scan a box on a moving conveyor below it.
Figure 3:
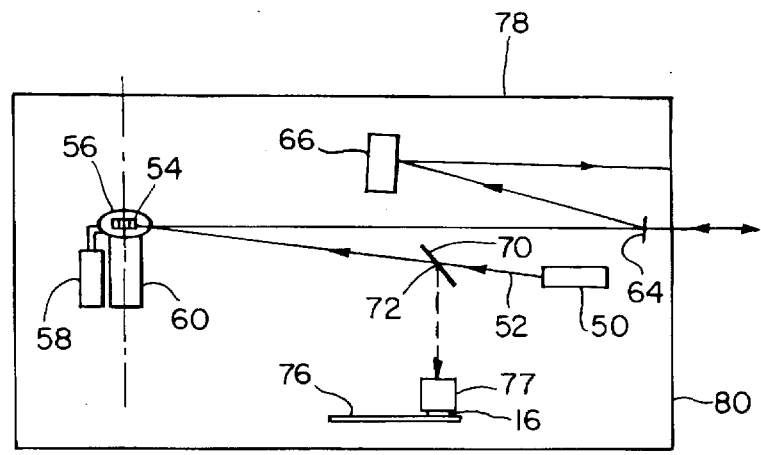
FIG. 3 is a side elevational view of the scanning system of FIG. 1.

Flying spot scanner 15, FIGS. 2 and 3, includes a laser diode 50 which directs a beam 52 to rotating or spinning faceted wheel 54 which may be encased in a vacuum chamber 56 to reduce air friction. The vacuum chamber is maintained through vacuum pump 58 and wheel 54 is spun or driven by air bearing motor 60. Motor 60 may drive wheel 56 at speeds of up to 30,000–40,000 RPM. Wheel 56 may be driven at speeds beyond 30,000 or 40,000 RPM up to levels of 80,000 or 90,000 RPM; hence the desirability of vacuum housing 56. The rotation of wheel 56 generates from beam 52 a series of scanning spot beams 62 which strike folding mirror 64 and are folded or redirected back to parabolic mirror 66. The use of parabolic mirror 66 converts the angle orientation of scanning beams 62 to the parallel orientation 62a of the scanning spot beams as they leave parabolic mirror 66. This enables the spot traveling along scan path 68 to always travel at the same speed, no matter how far the object to be scanned is from the rotating wheel 54. The return beams return along the same path until they reach return mirror 70 which contains a small hole 72 for passing the original beam 52 from laser 50. Since the beam is now somewhat spread, most of the beam strikes return mirror 70 around that hole and is directed through receiver telescope 77 to optical sensor 16 on the optical receiver electronic circuit board 76. The entire apparatus can be contained in housing 78 with a transparent enclosure window 80 and located above conveyor 82 which conveys the objects 84 to be scanned. In FIG. 2 the objects are moving into or out of the paper while the scan lines move across the object laterally from left to right or right to left. The beginning and the end of each scan line is marked by sensors 81 and 83, respectively, that sense the beginning and the end of the scan line.

Figure 4:
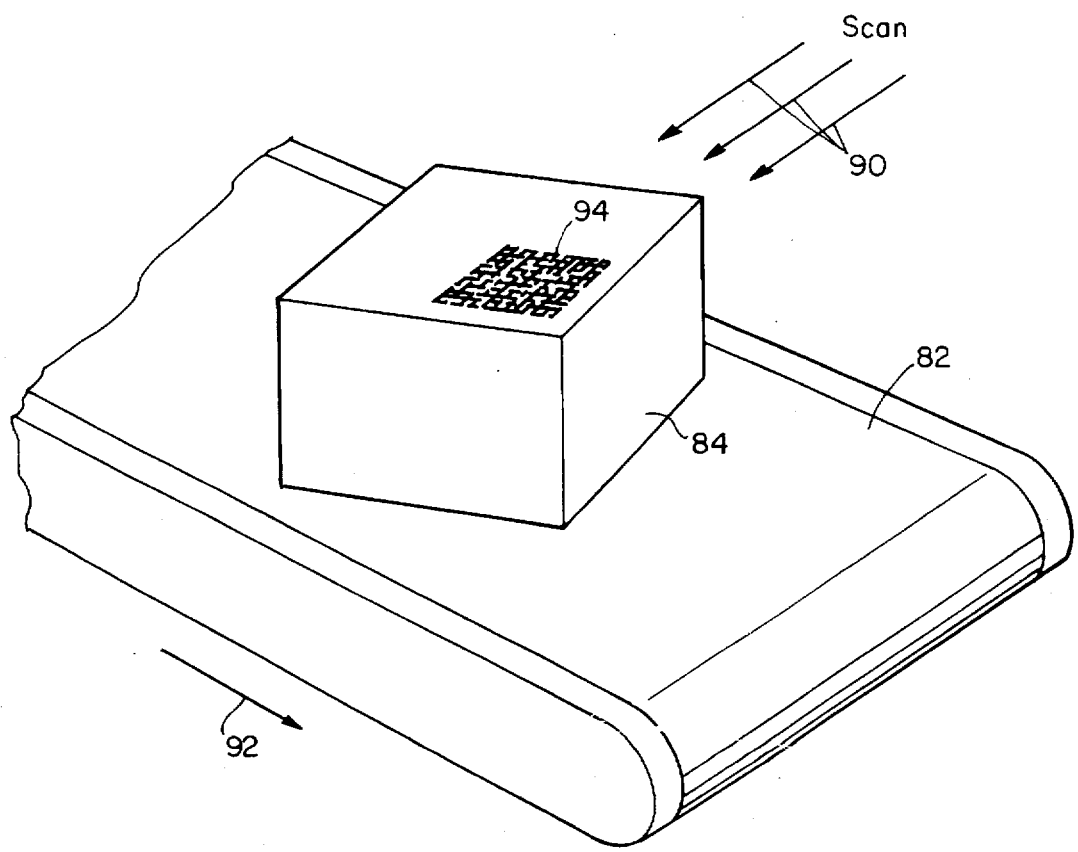
FIG. 4 is a diagrammatic perspective view of an object moving on a conveyor showing a relative directions of the conveyor motion and the scan lines.
Figure 5B:
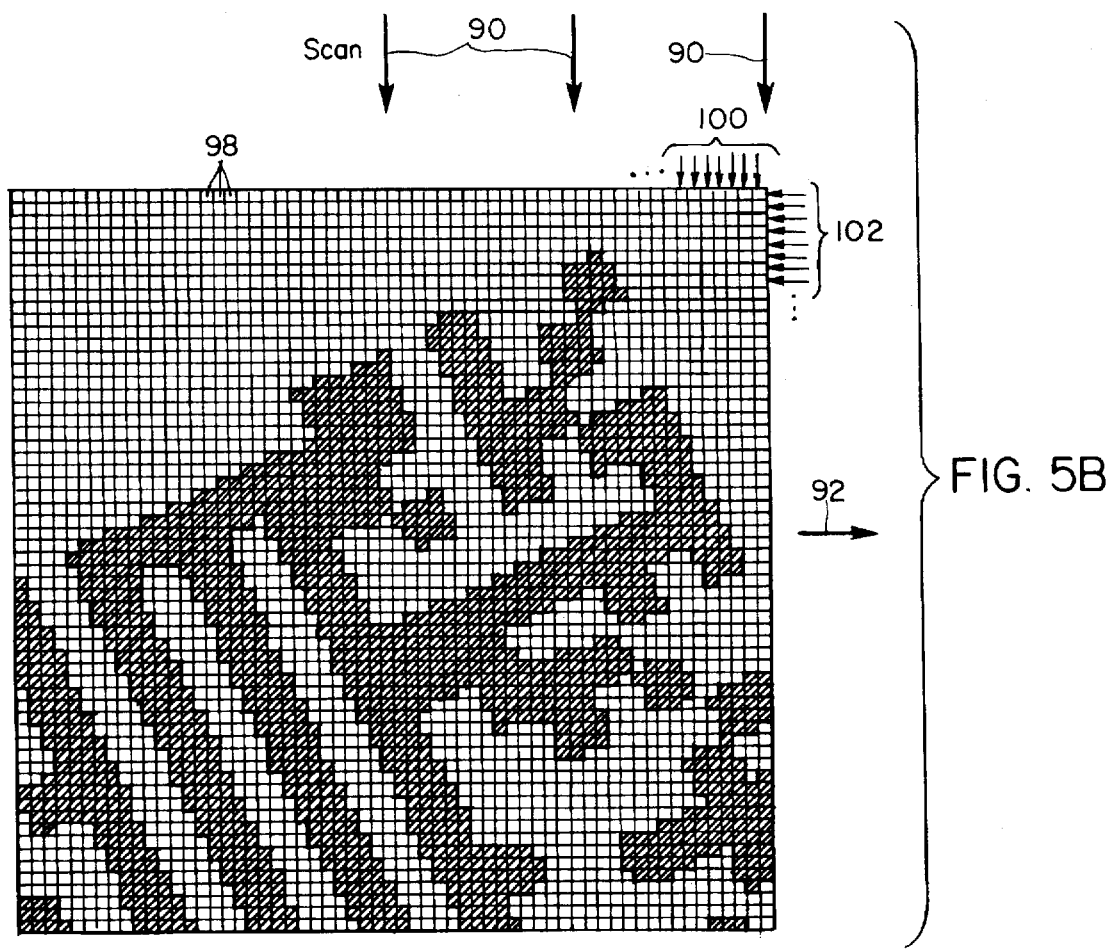
FIGS. 5A and 5B are enlarged views of a portion of the two-dimensional label shown on the object of FIG. 4 as it is stored in the buffer of FIG. 1.
Figure 5A:
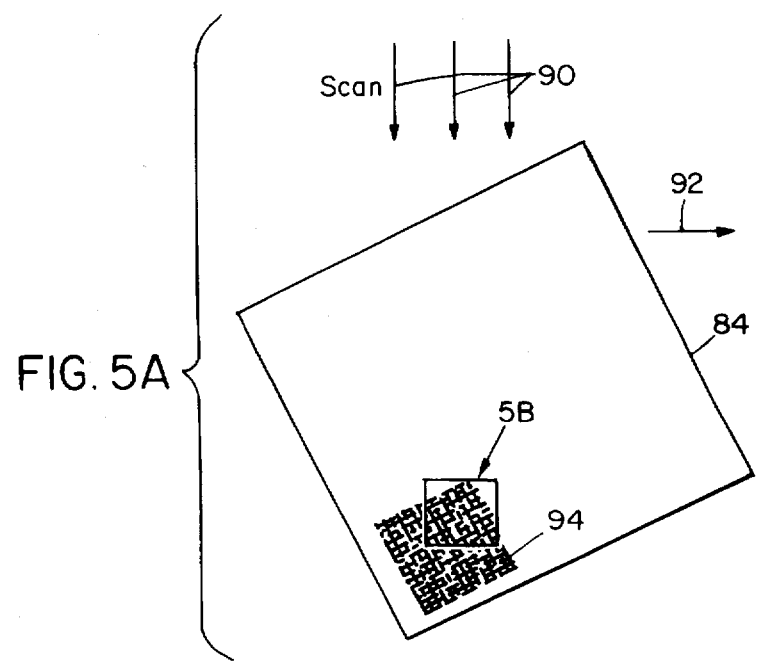
Figure 6:
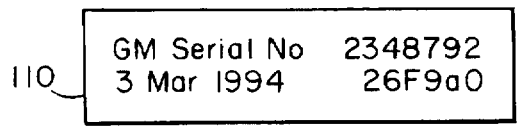
FIG. 6 illustrates typical information obtained from decoding the label.

Typically, as shown in FIG. 4, a flying spot scanner provides a plurality of scan lines 90 which define the path of the spot. These scan lines scan at a first velocity in a first direction while the object 84 moves on conveyor 82 at a second velocity in a second direction 92. Object 84 carries a two-dimensional label 94 bearing information to be acquired by the scanner system of this invention. When the speed of the scan lines 90, FIG. 5, is properly synchronized with the speed of the object 84 on the conveyor, each pixel 98 is undistorted, for example, has a square shape. Each column of pixels 100 represents the data acquisition made by the flying spot for each of the scan lines 90. Each row of pixels is determined by the speed of the sampling rate of the A/D converter 28, FIG. 1. The entire label 94 may actually represent, when translated by image processor 34 and interface 36, a simple statement identifying manufacturer, date and serial number, for example, such as shown in box 110, FIG. 6.

Figure 7:
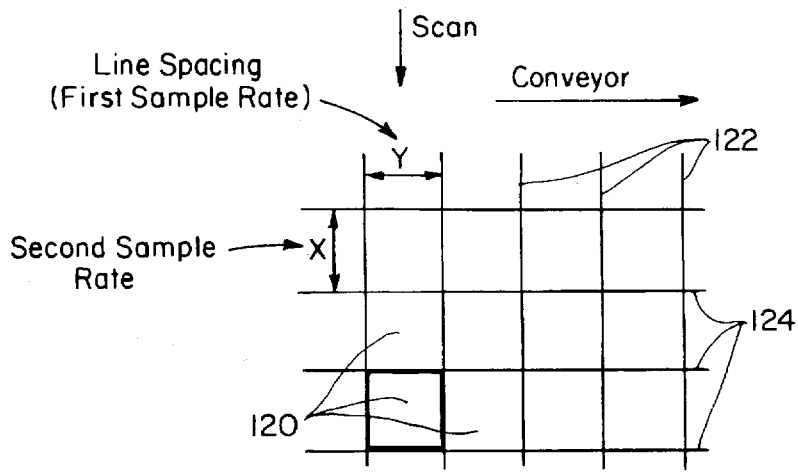
FIG. 7 is a line diagram showing the line spacing and sampling rate that develop square pixels such as shown in FIG. 5.
Figure 8:
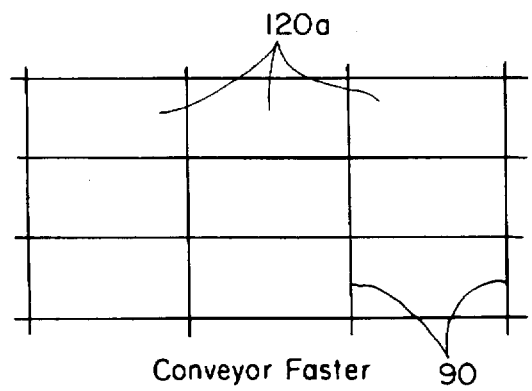
FIG. 8 is an illustration similar to FIG. 6 where the conveyor speed is increased and the pixels are elongated along the conveyor direction.
Figure 10:
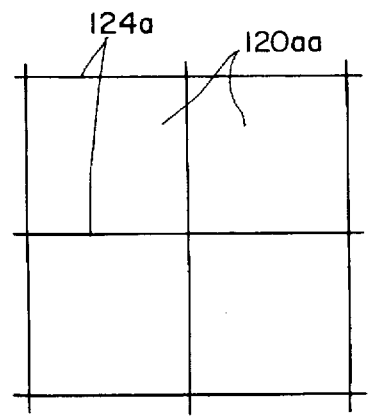
FIG. 10 illustrates the square pixels obtained when the sample rate is adjusted to overcome the increased conveyor speed as represented in FIG. 8.
Figure 9:
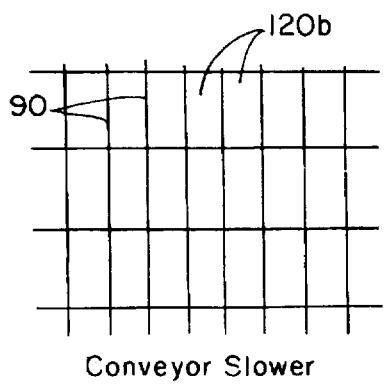
FIG. 9 is a view similar to FIG. 7 wherein the conveyor is operating at slower speed and the scan lines are closer than in FIG. 7 and produce foreshortened pixels.
Figure 11:
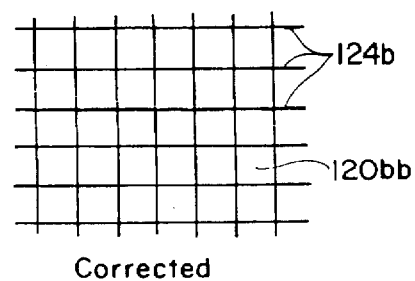
FIG. 11 illustrates the square pixels obtained when the sample rate is decreased in order to accommodate the slower conveyor speed represented in FIG. 9.

The synchronization between the scan rate and the velocity of the conveyor is necessary to provide undistorted pixels to produce an undistorted two-dimensional image of the one-dimensional scan as shown in FIGS. 7–11. For example, as shown in FIG. 7, where vertical lines 122 symbolize the line spacing of scan lines 90 whereas the horizontal lines 124 symbolize the sample rate of the A/D converter 28, a small portion of the label, as shown in FIG. 5, is indicated as having pixels 120 which are all equal in size and square in shape. However, as shown in FIG. 8, if the conveyor were suddenly to start to move faster, pixels 120 would take on an elongated shape 12a, FIG. 8, stretched in the direction of the conveyor motion. This is so because the scan lines 90 would be spaced farther apart. Conversely, if the conveyor began to move more slowly, as shown in FIG. 9, the scan lines 90 would occur closer together foreshortening the pixels as indicated at 120b.

Figure 12:
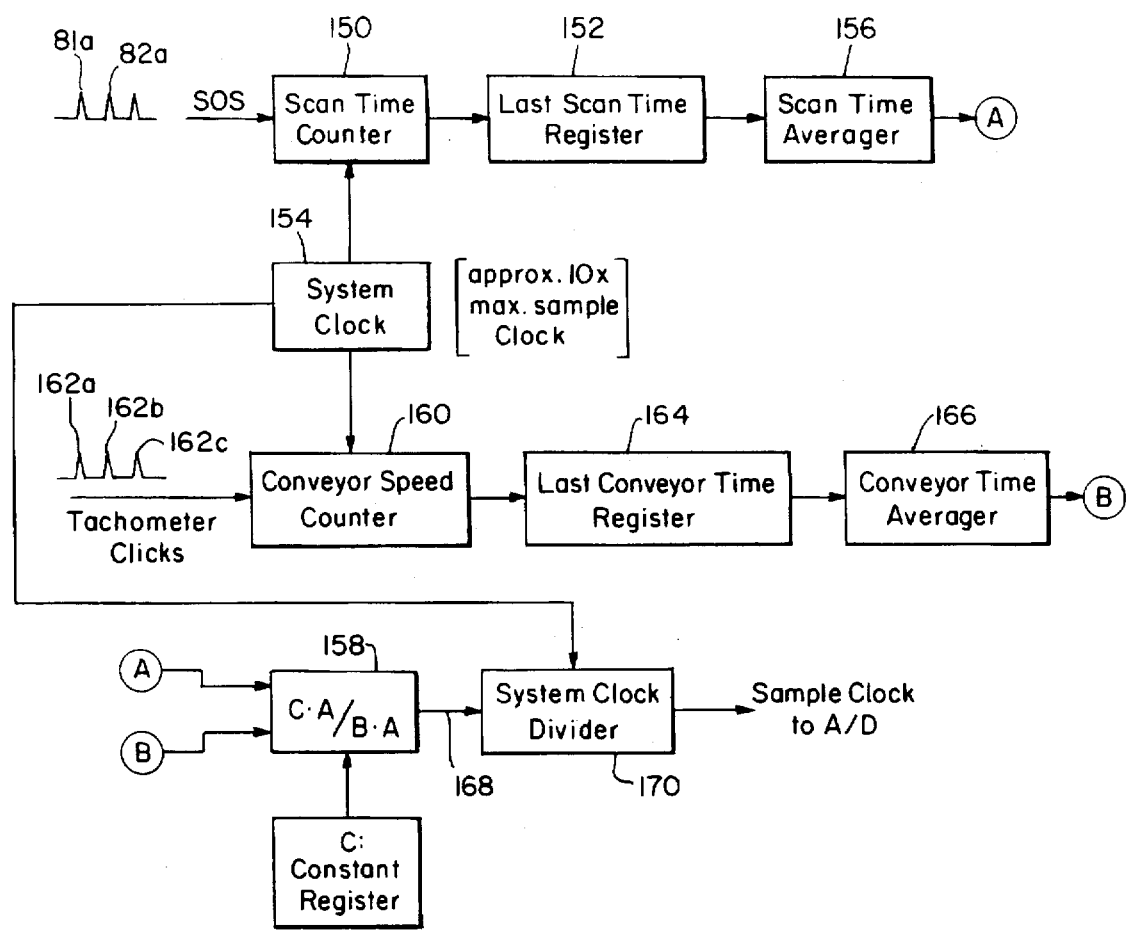
FIG. 12 is a schematic block diagram of the compensator device of FIG. 1.

This distortion of the pixels 120 in FIGS. 8 and 9 can be corrected by adjusting the sampling rate of A/D converter 28, FIG. 1. Thus in FIG. 10 the sampling rate, as indicated by lines 124a have been spaced farther apart: that is, the A/D sampling rate has been slowed down so that the pixels 120aa are once again square. Conversely, in FIG. 11 the sampling rate has been increased so that lines 124b occur closer together and reestablish once again the square shape of pixels 120bb. The synchronization required to perform this adjustment is accomplished by sample rate adjustment circuit 42, FIG. 12, that includes scan time counter 150 which responds to the receipt of an output from the beginning and end of scan line sensors 81, 83, shifts its count into the last scan time register 152 and begins to count again. Scan time counter counts the number of clock pulses from system clock 154 during the time between the beginning and end of scan pulses 81a and 82a, respectively. The times stored in register 152 are typically averaged over a large period of time in scan time averager 156 and delivered to the sample rate calculator 158. Separately, the output from timing device 41, such as a tachometer on the conveyor, is delivered to conveyor speed counter 160. Conveyor speed counter 160 counts the number of clock pulses from system clock 154 between the tachometer clicks 162a, 162b, 162c, and delivers the time to last conveyor time register 162, 164. As with the scan time, these times are averaged in a conveyor time averager 166 whose output is delivered to sample rate calculator 158. Since the scan line extends for a length of approximately thirty inches whereas the tachometer registers the passage of the conveyor approximately every tenth of an inch, a constant value C is introduced into the sample time calculator 158 in order to produce the proper scaling factor. The output representing the proper sample time expressed in system clock pulses is delivered on line 168 to system clock divider 170 which provides a direct input to A/D converter 28, address logic 30, zero crossing detector 38, and address logic 40.

The theory of operation of sample rate adjust logic 42 can be understood in accordance with the following explanation. The first sample rate is defined as that of the line spacing, that is, the distance between scan lines in the direction of the conveyor motion. The second sample rate, which is the sample rate of A/D converter 28, is defined as follows.

$$\text{2nd sample rate} = \frac{\text{linespacing(1st s.r.)}}{\text{scan(spot)speed}} \quad (1)$$

This can be expressed as:

As simplified, then the second sample rate becomes
where conveyor speed equals distance over time, scan time equals $t_1-t_2$, height of scan $$\text{2nd sample rate} = \frac{\text{conveyor speed} \cdot (t_1 - t_2)}{\left(\frac{\text{height of scan}}{(t_1 - t_2)}\right)} \quad (2)$$

$$\text{2nd sample rate} = \frac{\text{conveyor speed} \cdot (t_1 - t_2)^2}{\text{height of scan}} \quad (3)$$

is actually the length of scan from the beginning to the end of the scan line, line spacing is the conveyor speed times the scan time, and the scan (spot) speed is the height of scan over scan time. For a situation in which the conveyor is moving at 200 feet per minute and there are 4,000 scans per second each of which is thirty inches in length, the sample rate can be calculated as follows:

$$\text{2nd sample rate} = \frac{200 \text{ ft/min} \cdot \left(\frac{1 \text{ sec}}{4,000 \text{ scans}}\right)^2}{30 \text{ inches}} \quad (4)$$

$$\text{2nd sample rate} = \frac{200 \text{ ft} \cdot 12}{30 \text{ inches}} \cdot \frac{\text{sec} \cdot \text{sec}}{\text{min} \cdot 60 \text{ sec}} \cdot \frac{1}{4,000^2 \text{ scans}^2} \quad (5)$$

$$\text{2nd sample rate} = \frac{2400}{1800 \cdot 16 \times 10^6} \text{ sec} \quad (6)$$

$$\approx 83 \text{ nS}(12 \text{ MHz}) \quad (7)$$

Figure 13:
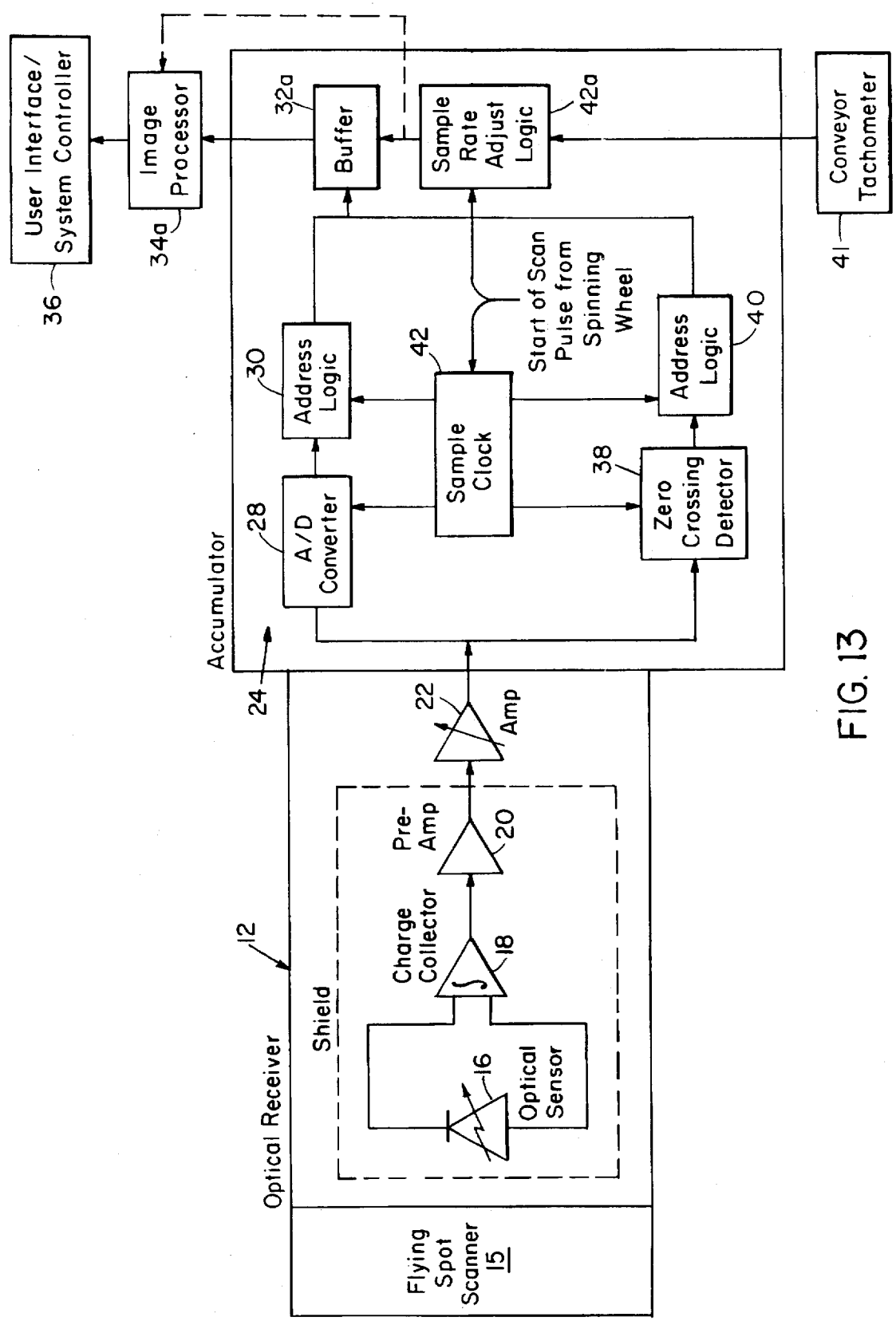
FIG. 13 is an alternative embodiment of the one-dimensional scanner system as shown in FIG. 1.

Although thus far the sample rate adjust logic 42 has been shown as an integral part of the frame accumulator 14, this is not a necessary limitation of the invention as the sample rate adjust logic may be provided subsequent to that process directly into the buffer 32a, FIG. 13, or even into the ultimate image processor 34a.

There is shown in FIG. 14 optical receiver 12a according to this invention which includes an avalanche photodiode 200 such as an SD-036-70-62-521 available from Advanced Photonix Inc., Camarillo, Calif. 93012. High-voltage power supply 202 provides a voltage of approximately $-257.7$ volts across diode 200. This is the reverse breakdown current for the diode. High-voltage power supply 202 may in turn be energized by a 12-volt battery or a similar supply through an adjustable resistor 204. Each photon of light impinging on diode 200 produces a unit of electron current flow which is collected in charge collector circuit 206 that is typically an integrating operational amplifier. The output is further amplified in preamp 208 and again in adjustable gain amplifier 210, both of which can be conventional operational amplifiers, to provide the final output optical signal on line 212.

The use of avalanche diode 200 eliminates the need for a resistance which coupled with the capacitance of the typical PIN diode used, creates a conflict between high bandwidth and high sensitivity in the optical receiver. By using an avalanche diode, the resistance is no longer needed and the trade-off is not imposed.

Figure 15:
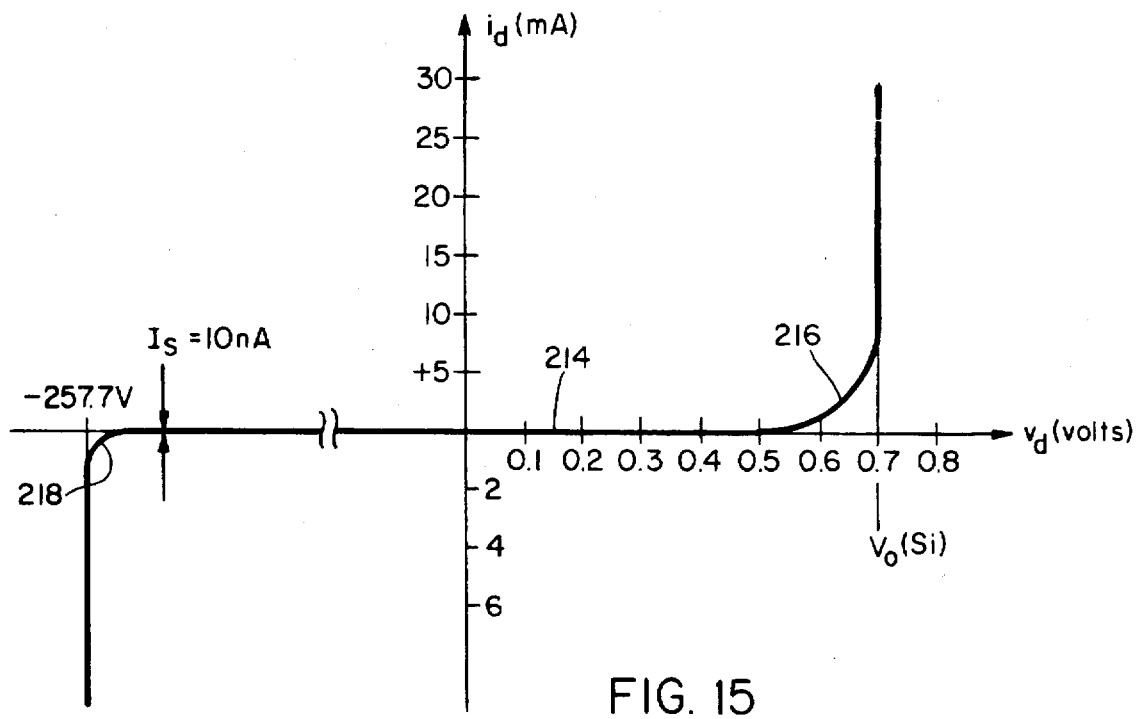
FIG. 15 is the current versus voltage characteristic of the avalanche photodiode of FIG. 14.
Figure 16:
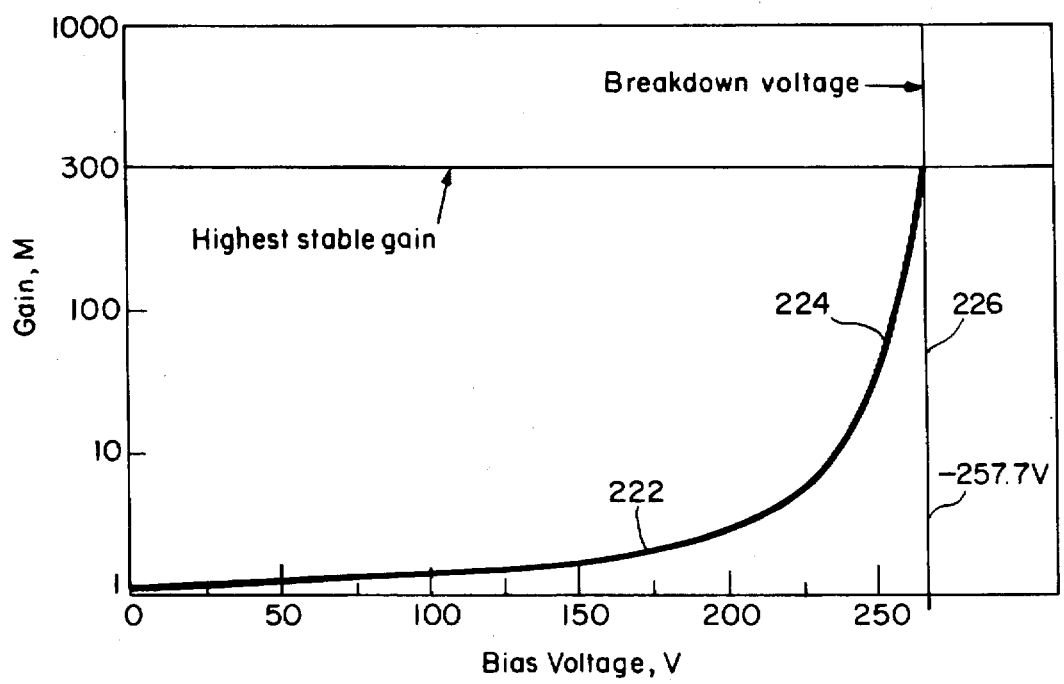
FIG. 16 is the gain versus bias characteristic of the avalanche photodiode of FIG. 14.

Avalanche diode 200 has a current versus voltage characteristic 214, FIG. 15, which is conventionally forward biased at a forward bias voltage $V_o$ of approximately 0.7 volt+. In the region 216 just prior to the forward bias voltage point the diode has a generally 1:1 slope so that one photon of light energy produces one unit of current, i.e., a gain of one. However, by reverse biasing diode 200 just short of its reverse bias voltage of $-257.7$ volts, a slope in the region 218 just before the breakdown point provides a much larger gain of approximately 300 where an increase of one photon results in an increase of 300 units of current. Thus operating at this point with diode 200 provides extremely high sensitivity without loss of bandwidth. The high gain or high sensitivity can be seen more graphically in FIG. 16, where the gain versus bias characteristic 222 can be seen to have a very steep slope in the region 224 just prior to the breakdown voltage boundary 226 at −257.7 volts.

Figure 17A:
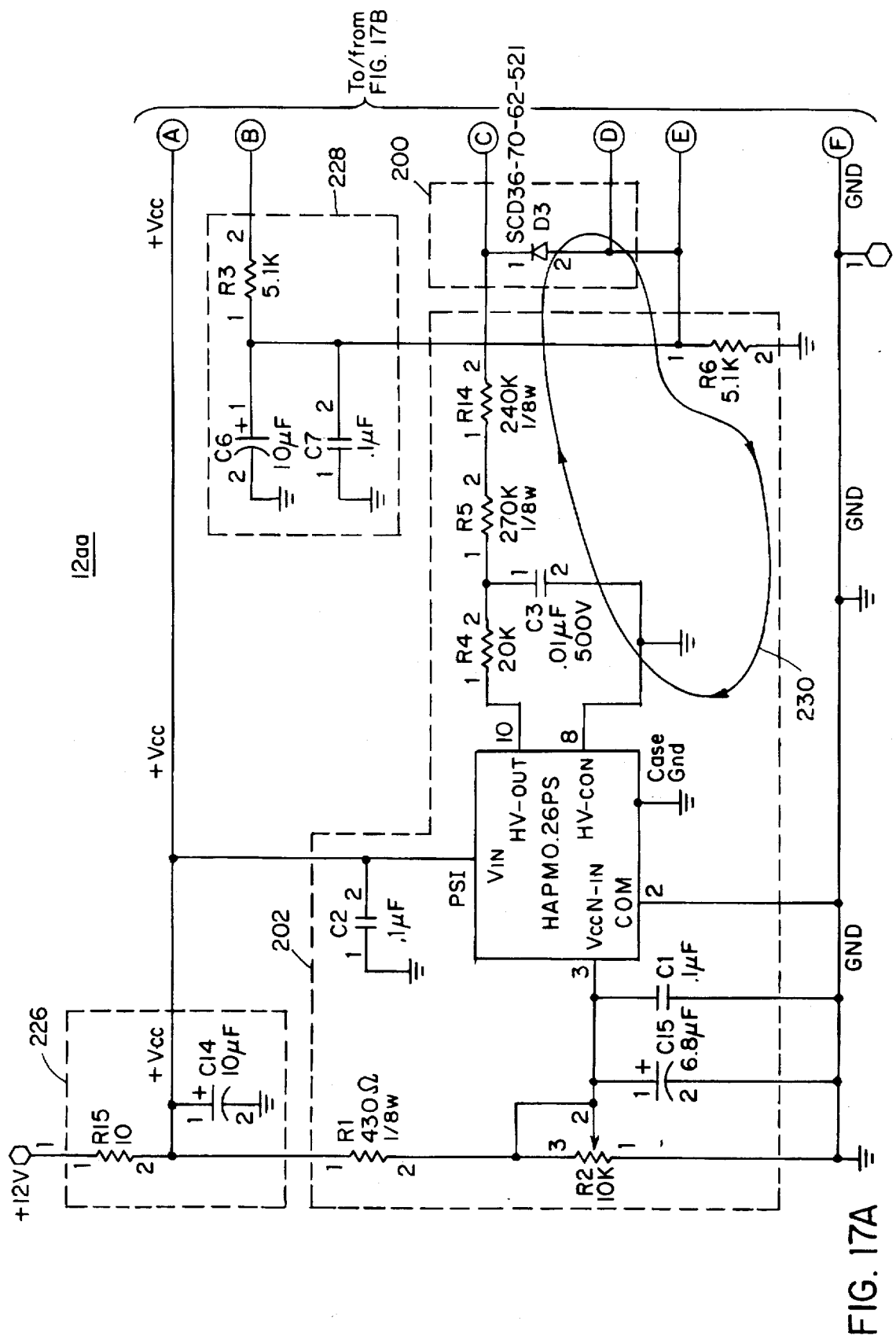
FIGS. 17A and 17B are more detailed schematic block diagrams of the optical receiver of FIG. 14.
Figure 17B:
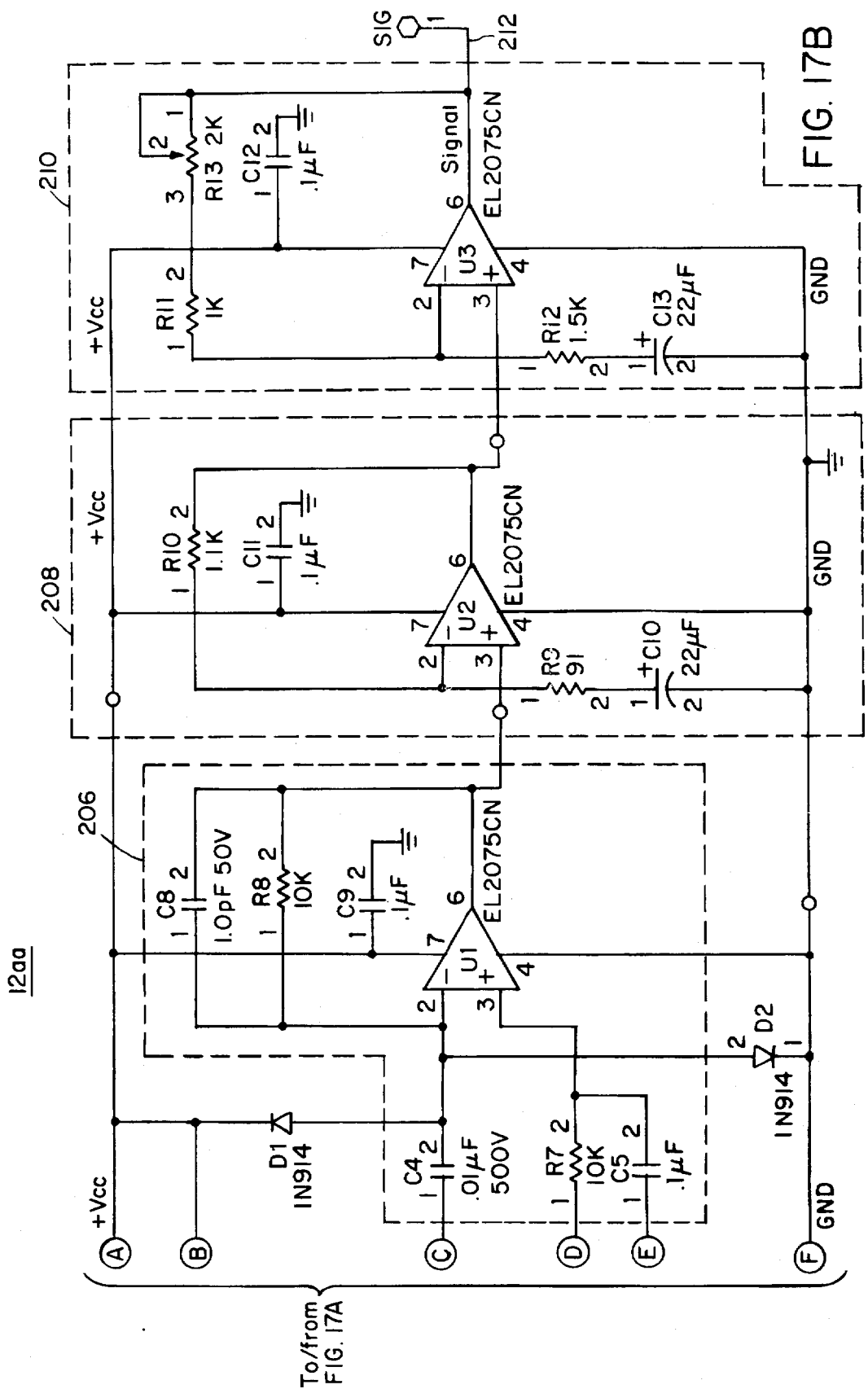

In one embodiment, optical receiver 12a may be implemented by optical receiver 12aa, FIG. 17. Optical receiver 12aa includes noise filters 226 and 228 in addition to the components shown in FIG. 14. A constant small current in the range of 7.8 nA flows through avalanche diode 200 in the loop indicated by arrow 230. Resistor R7 and capacitor C5 in charge collector 206 causes subtraction in amplifier U1 that removes the d.c. and a.c. components introduced by resistor R8 and capacitor C8, respectively, so that their effect at the output of amplifier U1 is cancelled. Also in charge collector 206, capacitor C4 blocks the −257.7 volts d.c. from reaching amplifier U1 and ensures that only changes in the current from avalanche current 200 will reach amplifier U1. Capacitor C8 is used to determine the time period for collection of electrons by avalanche diode 200 that produces an increment of output. The longer the time period of the collection, the more electrons are collected, and hence the more sensitive will be the device, but the trade-off is that the longer time period makes the device operate somewhat more slowly. The adjustability of adjustable gain amplifier 210 is effected by adjustable resistor R13.

While potentiometer or adjustable resistor 204 in FIG. 14 provides some level of control to maintain the approximately −257.7 volt level of avalanche diode 200, more precise control can be obtained by using automatic voltage control circuit 204a, FIG. 18, in conjunction with resistor 232 in series with avalanche diode 200. Control circuit 204a monitors the current through diode 200 by sensing the voltage across resistor 232 and adjusts the power supply to photodiode 200 to maintain the photodiode constantly at just shy of the reverse breakdown voltage.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A high-speed, high-resolution, optical scanner system comprising:

a flying spot scanner for scanning a beam across an object bearing information to be read; and a high-bandwidth, high-sensitivity optical receiver including an avalanche photodiode for sensing the variation in light intensity in the beam reflected from the object being scanned; a charge collector circuit, responsive to said avalanche photodiode, for producing a voltage proportional to the light incident on said avalanche photodiode; and a power source for biasing said avalanche photodiode proximate its reverse breakdown voltage to produce high current gain in response to incident light, said power source including a voltage control circuit for sensing, during quiescent non-avalanche conditions, the current through said avalanche photodiode and adjusting the power supplied to said avalanche photodiode to maintain said avalanche photodiode proximate its reverse breakdown voltage.

2. The high-speed, high-resolution optical scanner system of claim 1 in which said charge collector circuit includes a timer circuit for defining the increment of time during which the electrons generated by light incident on said avalanche photodiode are accumulated.

\* \* \* \* \*